Nov. 30, 1948.    H. N. FAIRBANKS    2,455,051
FILM SPROCKET CLAMP
Filed Sept. 24, 1945
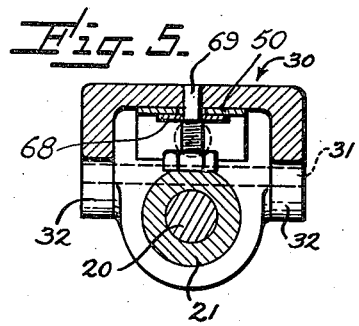
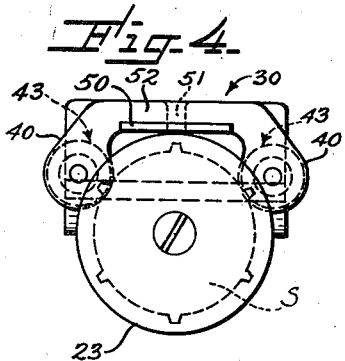
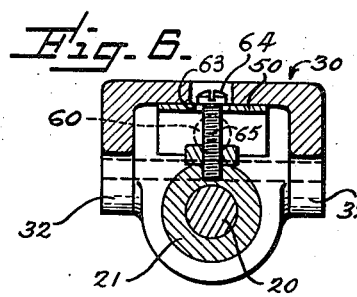
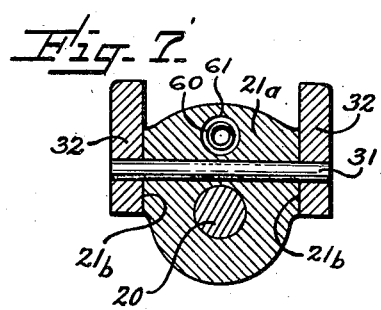
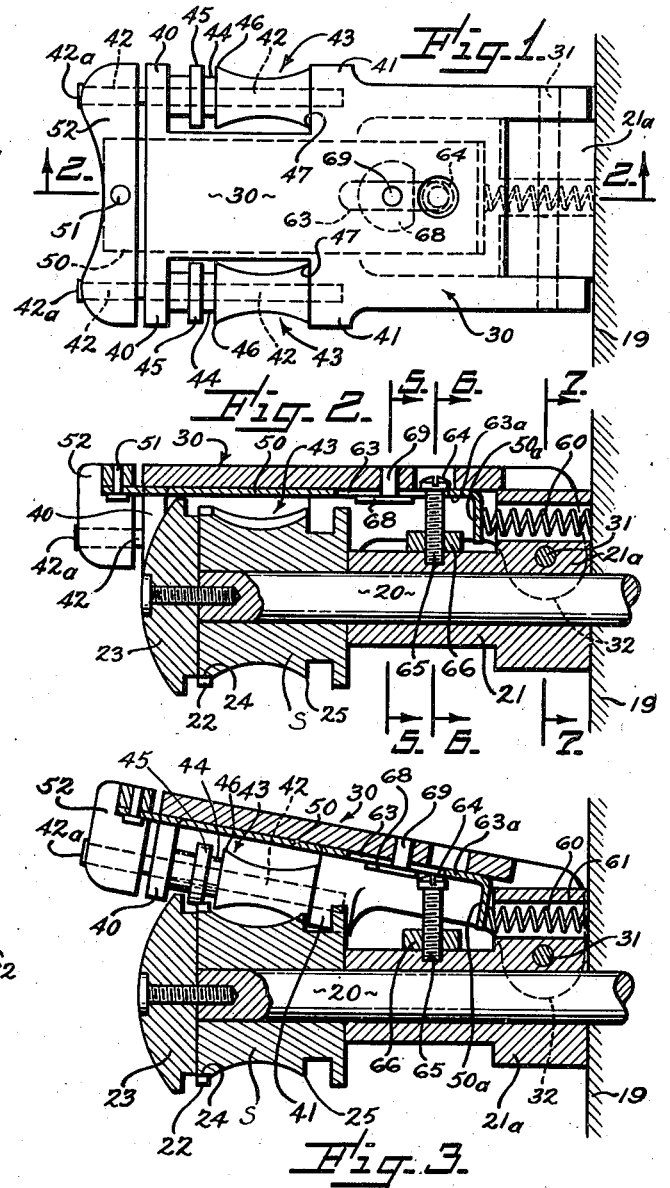
Inventor
Henry N. Fairbanks
Attys Patented Nov. 30, 1948

2,455,051

UNITED STATES PATENT OFFICE 2,455,051

FILM SPROCKET CLAMP

Henry N. Fairbanks, Beverly Hills, Calif., assignor to Mitchell Camera Corporation, West Hollywood, Calif., a corporation of Delaware Application September 24, 1945, Serial No. 618,160

9 Claims. (Cl. 271—2.3)

This invention has reference to releasable and settable film clamps or guards for film feeding sprockets of kinetograph mechanisms; and the general objective and purpose of the invention is the provision of a simple, positive clamp which is easily operated for setting and release and which provides a free open space, without interfering projecting parts, to facilitate easy threading of the film.

The nature of the invention will be best understood from the following detailed description of a preferred embodiment, reference for that purpose being had to the accompanying drawings in which:

Fig. 1 is a plan, on an enlarged scale, of a preferred and illustrative embodiment of the invention;

Fig. 2 is a longitudinal section on line 2—2 of Fig. 1, showing the clamp in its closed or operating position;

Fig. 3 is a similar section showing the clamp in its open position;

Fig. 4 is an end view, and

Figs. 5, 6 and 7 are transverse sections taken respectively on line 5—5, 6—6 and 7—7 of Fig. 2.

In the drawings the sprocket shaft is shown at 20 journalled in a bearing 21 which is mounted on a part 19 of the framing or casing of the mechanism. Either bearing 21, or the frame part 19 to which the bearing is affixed, may be regarded as the mounting member on which the sprocket is journalled and which supports the clamp. Shaft 20 carries sprocket S on its outer projecting end. The sprocket is shown as having only one set of teeth 22; the particular and illustrative design which is here shown being for 16 mm. film which has a single row of sprocket holes. A cap 23 overlies the end of the sprocket and the sprocketed edge of the film. Using sprockets such as shown, the film normally rides near its edges on the sprocket surface 24 between the teeth and, at its opposite edge, on a surface 25 of the sprocket.

The general function of a film clamp or guard is to hold the film in contact with the sprocket and in engagement with the sprocket teeth through an arc of travel large enough to insure that the film is continuously in proper engagement with at least one, and preferably two or more sprocket teeth.

The illustrative form of the invention comprises a clamp body 30 which is generally elongate in form and is pivoted at its rear end on a pivot pin 31, the body having two depending ears 32 to take the pivot pin. Pivot pin 31 is preferably mounted in the rear enlarged portion 21a of shaft bearing 21. As shown particularly in Fig. 7 this rear enlarged portion 21a has two opposed parallel vertical faces 21b against which the inner faces of body ears 32 fit sufficiently closely to limit the clamp body against any loose translative movement in a horizontal direction parallel to pivot pin 31. The body thus confined to swinging movement about pivot pin 31 between the closed position of Fig. 2 and an open position such as that shown in Fig. 3.

At the opposite side of its outer or swinging end the body has two sets of depending ears or lugs 40 and 41 which carry the two pivot shafts 42 for the film confining rollers 43. These film confining rollers have near one end an annular groove 44 to take sprocket teeth 22. Outside groove 44 the rollers have full diameter portions 45 which press the extreme outer edge of the film down toward the sprocket, and immediately inside the groove 44 these rollers have an annular surface or edge 46 adapted to press the film onto sprocket seating surface 24 immediately inside the sprocket teeth. And at their other ends the rollers have a surface or edge 47 which is adapted to press the film onto sprocket edge or surface 25. In the set or closed position of the clamp, rollers 43 are in the relative positions shown in Figs. 2 and 4, holding the film closely in engagement with the sprocket but without exerting undue pressure on the film.

A longitudinally movable latch bar 50, in the form of a thin wide strip of sheet metal (preferably a piece of flat spring steel or other hard metal) is positioned immediately against the central under or inner surface of body 30 in a position where it will sufficiently clear the sprocket teeth and the outer edge of head 23 when the clamp is closed as shown in Fig. 2. The outer end of latch bar 50 is rigidly secured, as at 51, to a thumb piece 52 which is slidably mounted on the projecting ends of roller pivot shafts 42. The thumb pieces are thus guided for longitudinal movement, and likewise the outer end of latch bar 50 is guided in longitudinal movement. At its inner end the latch bar is turned down as shown at 50a to form a lug against which compression spring 60 pushes in a forward direction. Spring 60 is conveniently mounted in a longitudinal bore 61 in enlargement 21a of bearing 21, and it constantly pushes against latch 50 to move the latch bar and thumb piece 52 outwardly to the position shown in the drawings. Near its inner end latch bar 50 has a longitudinal slot 63 which is wide enough to pass the head 64 of screw 65 which is adjustably set in bearing 21 and may be locked in set position by a lock nut 66. At its inner end the latch bar 50 is held up in close but movable engagement with the under face of body 30 by a bearing plate or head 68 mounted on a guiding rivet 69 which extends through slot 63.

In the normal or closed position of the clamp the inner end edge 63a of latch slot 63 engages under the rear edge of screw-head 64. In that position the latch is pressed forward by spring 60, and thumb piece 52 is in such a position as is shown in Figs. 1, 2 and 3. By adjustment of screw 65 the clamp is held in proper adjustable position to properly confine the film against the sprocket. When it is desired to release the clamp, thumb piece 52 is pressed inwardly to move the latch bar and clear its edge 63a from under the screw head. The clamp can then be raised to the open position of Fig. 3 by the same finger movement which has pressed thumb piece 52 inwardly. It may be noted that the pressure of spring 60 is exerted on latch 50 in such a position relative to pivot 31 that the spring pressure tends to swing the whole latch downwardly instead of upwardly. So, if it were desired, pivot 31 could be located higher and at a point above the spring. But that is not necessary. When pressure is released on thumb piece 52 the first action of the spring is to press latch 50 forwardly so that its latching edge 63a overlies screw-head 64, and the whole clamp is thus held in its upper open position as shown in Fig. 3. That position may of course be as wide open as is desired; Fig. 3 simply shows a typical angle of opening. But if a wider opening is desired, the head of screw 64 can be made to be vertically thicker, so that the clamp will be held more widely open. The outward movement of latch 50 with relation to body 30 may be limited to a position such as that shown in Fig. 3 by any suitable stop arrangement, as for instance by providing the outer ends of roller shafts 42 with slight heads 42a.

The upper surface of screw head 64 is rounded or sloping (typically it may be called conical); so that it is only necessary to press down on the clamp to close it to the position of Fig. 2, latch edge 63a being cammed back by the screw head as the clamp is pressed down. With the clamp pressed down to the position of Fig. 2 latching edge 63a snaps under the screw head to lock the clamp in its adjusted closed position.

I claim:

1. A clamp device for a film sprocket which is journalled on and projects outwardly axially from a stationary mounting member, said clamp device comprising an elongate body, means pivoting an inner end of the body to the mounting member on an axis transverse of the sprocket axis so that the other end of the body may lie in a position projecting outwardly adjacent the sprocket and substantially parallel to its axis or may be swung away from the sprocket, means carried on the outer part of the body and adapted to confine a film against the sprocket when the body is in its first mentioned position, and means for releasably locking the body in its first mentioned position comprising a longitudinally extending and slidable latch bar carried on the face of the body which is adjacent the sprocket, a latch operating member mounted on the outer end of the body for longitudinal movement with relation thereto and connected with the outer end of the latch bar, a spring acting on the latch bar to move it and said latch operating member outwardly, the latch bar having an outwardly facing latching edge, and a locking member mounted on the mounting member and having a head under which the latching edge is projected by outward movement of the latch bar.

2. A clamp device as specified in claim 1, and in which the film confining means comprises a pair of laterally spaced rollers and longitudinal axis shafts for the rollers, and in which the latch operating member is mounted on said axis shafts for longitudinal movement relative to the body.

3. A clamp device as specified in claim 1, and in which the inner portion of the latch bar is provided with a longitudinally extending slot and an inner end wall of the slot constitutes the forwardly facing latching edge.

4. A clamp device as specified in claim 1, and in which the locking member is a headed screw adjustably screw threaded into the mounting member.

5. A clamp device as specified in claim 1, and in which the locking member is a headed screw adjustably screw threaded into the mounting member, the screw head having a conical outer face against which the latching edge may rest when the body is in its second mentioned position, the conical outer face acting as a cam to move the latch bar rearwardly when the body and latch bar are pressed toward the sprocket.

6. A clamp device as specified in claim 1, and in which the inner portion of the latch bar is provided with a longitudinally extending slot and an inner end wall of the slot constitutes the outwardly facing latching edge, and means for confining the inner portion of the latch bar against the face of the body comprising a headed guide member secured to the body and projecting through the latch bar slot with its head bearing against the latch bar.

7. A clamp device for a film sprocket which is journalled on and projects outwardly axially from a stationary mounting member, said clamp device comprising an elongate body, means pivoting an inner end of the body to the mounting member on an axis transverse of the sprocket axis so that the body may lie in a film confining position projecting outwardly adjacent the sprocket and substantially parallel to its axis or may be swung away from the sprocket, film engaging means carried by the body and adapted to confine a film against the sprocket when the body is in its first mentioned position, and means for releasably locking the body in its first mentioned position, said means comprising a longitudinally extending and longitudinally slidable latch bar carried by the body, a spring acting on the latch bar to move it in one direction, and a locking member mounted on the mounting member and having a shoulder with which an edge of the latch bar is engageable by movement of the bar in said direction.

8. A clamp device as defined in claim 7 and in which the spring acts on the latch bar to move it outwardly, the inner portion of the latch bar is provided with a longitudinally extending slot and an inner end wall of the slot constitutes an outwardly facing latching edge, the locking member is a headed screw adjustably screw-threaded into the mounting member, the screw head having a conical outer face against which the latching edge may rest when the body is in its second mentioned position, the conical outer face acting as a cam to move the latch bar rearwardly when the body and latch bar are pressed toward the sprocket.

9. A clamp device as defined in claim 7, and in which the film confining means comprises a pair of laterally spaced rollers and longitudinal axis shafts for the rollers, and including also a latch operating member mounted on said axis shafts for longitudinal movement relative to the body, said operating member being connected to the latch bar.

HENRY N. FAIRBANKS.

No references cited.